United States Patent

Shishikura et al.

[11] Patent Number: 4,537,843
[45] Date of Patent: Aug. 27, 1985

[54] SECONDARY BATTERY

[75] Inventors: Toshikazu Shishikura; Hiroshi Konuma, both of Yokohama; Hidenori Nakamura, Kawasaki; Yukio Kobayashi, Sagamihara, all of Japan

[73] Assignees: Showa Denko Kabushiki Kaisha; Hitachi, Ltd., both of Japan

[21] Appl. No.: 663,540

[22] Filed: Oct. 22, 1984

[30] Foreign Application Priority Data

Oct. 26, 1983 [JP] Japan ................................ 58-199280
Feb. 27, 1984 [JP] Japan ................................ 59-034175

[51] Int. Cl.³ .......................................... H01M 10/40
[52] U.S. Cl. ..................................... 429/197; 429/198; 429/201; 429/213
[58] Field of Search ............... 429/213, 194, 197–199, 429/201

[56] References Cited

U.S. PATENT DOCUMENTS 4,321,114  3/1982  MacDiarmid et al. ............ 429/50
4,463,071  7/1984  Gifford et al. ................... 429/213 X
4,472,487  9/1984  Maxfield et al. ................. 429/194
4,472,488  9/1984  Maxfield et al. ................. 429/213

Primary Examiner—Anthony Skapars
Attorney, Agent, or Firm—Sughrue, Mion, Zinn, Macpeak and Seas

[57] ABSTRACT

A second battery, the negative electrode of which or both the negative and positive electrodes of which are made of a polymeric compound having conjugated double bonds in the main chain, is described. The electrolyte used in the battery is an ammonium salt represented by the following general formula:

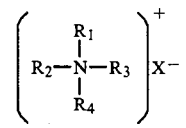

wherein $R_1$, $R_2$, $R_3$ and $R_4$ stand for an alkyl group having 1 to 16 carbon atoms or an aryl group having 6 to 15 carbon atoms, with the proviso that the case where all of $R_1$, $R_2$, $R_3$ and $R_4$ are the same groups is excluded, and X is an anion.

11 Claims, 2 Drawing Figures

SECONDARY BATTERY

BACKGROUND OF THE INVENTION (1.) Field of the Invention

The present invention relates to a secondary battery having a high energy density, a high charging-discharging efficiency, a long cycle life, a low self-discharge rate, and a good voltage levelness at the time of discharging.

(2.) Description of the Prior Art

It is known that an acetylene high polymer prepared by polymerizing acetylene by using a so-called Ziegler-Natta catalyst comprising a transition metal compound and an organometallic compound exhibits an electrical conductivity falling within the semiconductor region and is therefore useful as an electrical or electronic element material.

As means for preparing practical shaped articles of acetylene high polymers, there are known the following methods.

(a) A method in which a powdery acetylene high polymer is compression-molded.

(b) A method in which under specific polymerization conditions, polymerization is carried out to prepare a film of an acetylene high polymer having a fibrous microcrystalline (fibril) structure and having a high mechanical strength (see Japanese Examined Patent Publication No. 32581/73).

It also is known that when a shaped article of the powdery acetylene high polymer prepared according to the method (a) is chemically treated with an electron-accepting compound (electron acceptor) such as $BF_3$, $BCl_3$, HCl, $Cl_2$, $SO_2$, $NO_2$, HCN, $O_2$ or NO, the electrical conductivity is increased about 1,000 times at the highest, and in contrast, when the shaped article is treated with an electron-donating compound (electron donor) such as ammonia or methylamine, the electrical conductivity is reduced to about 1/10,000 in an extreme case.

Furthermore, it is known that when the filmy acetylene high polymer prepared according to the method (b) is chemically doped with an electron-accepting compound such as $I_2$, $Cl_2$, $Br_2$, ICl, IBr, $AsF_5$, $SbF_5$ or $PF_6$, or an electron-donating compound such as Na, K or Li, the electrical conductivity of the acetylene high polymer can be freely controlled within a broad range of from $10^{-8}$ to $10^{+3}$ $\Omega^{-1}\cdot cm^{-1}$. It has been proposed that this doped filmy acetylene high polymer be used as a material of a positive electrode of a primary battery.

In addition to the above-mentioned chemical doping method, there has been developed a method in which a p-type or n-type electrically conductive acetylene high polymer is prepared by electrochemically doping an acetylene high polymer with an anion such as $ClO_4^-$, $PF_6^-$, $AsF_6^-$, $AsF_4^-$, $CF_3SO_3^-$ or $BF_4^-$, or a cation such as $R'_4N^+$ (in which four R' groups are the same alkyl groups). A re-chargeable battery comprising an acetylene high polymer film prepared according to the method (b), which is electrochemically doped, has been reported. This battery comprises, as positive and negative electrodes two acetylene high polymer films having a thickness of, for example, 0.1 mm, which are obtained according to the method (b). When this battery is immersed in a tetrahydrofuran solution containing lithium iodide and is connected to a 9-V direct current power source, the lithium iodide is electrolyzed, the acetylene high polymer film as the positive electrode is doped with iodine and the acetylene high polymer film as the negative electrode is doped with lithium. This electrolytic doping corresponds to the charging step. If a load is connected to the two doped electrodes, the lithium ion is reacted with the iodine ion and an electric power can be taken out. In this case, the open circuit voltage (Voc) is 2.8 V and the short circuit current density is 5 mA/cm$^2$. When a tetrahydrofuran solution containing lithium perchlorate is used as the electrolyte, the open circuit voltage is 2.5 V and the short circuit current density is about 3 mA/cm$^2$.

Two acetylene high polymer films having a thickness of 0.1 mm, which are prepared according to the method (b), are independently wrapped with platinum meshes having a lead line taken out therefrom. When these wrapped films are immersed in an acetonitrile solution containing 1 mole/l of tetrabutylammonium perchlorate and charging is conducted with a constant current of 5 mA/cm$^2$ for a certain time, the acetylene high polymer film as the negative electrode is doped with the tetrabutylammonium ion and the acetylene high polymer film as the positive electrode is doped with the perchlorate ion. In this case, the open circuit voltage (Voc) of the battery is 2.5 V. If this battery is discharged at 1 mA/cm$^2$ until the battery voltage is reduced to 1.0 V, the discharge electricity can be taken out in a quantity corresponding to 81% of the quantity of the charge electricity.

Since these known batteries are formed by using as the electrode material an acetylene high polymer which is capable of providing a light-weight and small-size battery, these batteries have attracted attentions as cheap batteries having a high energy density, the weight and size of which can be easily diminished.

Almost all of electrolytes used as dopants in the above-mentioned known techniques have a low solubility in a solvent having a relatively broad range of stable voltages or they give electrolytic solutions having a low electrical conductivity, or the electrolytes per se or electrolysis products thereof have a reactivity with a solvent having a relatively broad range of stable voltages. Therefore, almost all of the known electrolytes cannot be used for solvents having a relatively broad stable voltage range.

For example, metallic lithium has a reactivity with a nitrile type solvent having a relatively broad stable voltage range, and therefore, use of a lithium salt comprising metallic lithium as the cation component as an electrolyte is not recommended. Furthermore, a tetrabutylammonium salt such as mentioned above is relatively highly soluble in a nitrile type solvent, and if the tetrabutylammonium salt is used as the electrolyte, a high charging-discharging efficiency can be obtained, but a satisfactory energy density cannot be obtained.

When a tetraethylammonium salt, which is another alkyl ammonium salt, is used as the electrolyte, the solubility of the tetraethylammonium salt in benzonitrile having a broad stable voltage range is very low and the saturation solubility at room temperature is lower than 1 mole/l. Accordingly, an electrolytic solution formed by dissolving the tetraethylammonium salt in benzonitrile is disadvantageous from the viewpoint of the energy density, and this solution cannot be used as an electrolytic solution for a battery having a high energy density.

Accordingly, development of an electrolyte, that is, a dopant, having a high solubility in an organic solvent having a relatively broad stable voltage range and a molar molecular weight as low as possible, being capable of giving a high electrical conductivity and having a good electrochemical stability and a low reactivity with a polymeric compound having conjugated double bonds in the main chain, which is used as the electrode, has been eagerly desired.

SUMMARY OF THE INVENTION

Under the above-mentioned background, it is a primary object of the present invention to provide a secondary battery which has a high energy density, a high charging-discharging efficiency, a long cycle life, a good voltage levelness and a low self-discharge rate, and is cheap, and the weight and size of which can easily be diminished.

More specifically, in accordance with the present invention, there is provided a secondary battery comprising a polymeric compound having conjugated double bonds in the main chain as a material of a negative electrode or a material of positive and negative electrodes, wherein an ammonium salt represented by the following general formula:

wherein $R_1$, $R_2$, $R_3$ and $R_4$ stand for an alkyl group having 1 to 16 carbon atoms or an aryl group having 6 to 15 carbon atoms, with the proviso that the case where all of $R_1$, $R_2$, $R_3$ and $R_4$ are the same groups is excluded, and X is an anion, is used as the electrolyte.

DETAILED DESCRIPTION OF THE PREFERRED EMBODIMENTS

The secondary battery of the present invention is advantageous over a known secondary battery comprising as an electrolyte an ammonium or lithium salt having a symmetric quaternary ammonium ion represented by the formula $R'_4N^+$ (in which $R'$ stands for an alkyl group and the four $R'$ groups are the same groups) as the cation component in that (i) the energy density is high, (ii) the voltage levelness is good, (iii) the self-discharge is reduced and (iv) the recycle life is long.

As specific examples of the polymeric compound having conjugated double bonds in the main chain (hereinafter referred to as "conjugated polymeric compounds"), used in the present invention, there can be mentioned an acetylene high polymer such as polyacetylene, poly-p-phenylene, poly-m-phenylene, poly(2,5-thienylene), polypyrrole, polyimide, polyquinoline, polyphenylacetylene, polyacene, a polyacene-quinone radical polymer, a quinazoline polymer having a Schiff base structure, a polyarylene-quinone and a thermal decomposition product of polyacrylonitrile or polyimide. Of course, polymeric compounds that can be used in the present invention are not limited to those exemplified above. Namely, any of polymeric compounds having conjugated double bonds in the main chain can be used in the present invention. Furthermore, either homopolymers or copolymers may be used. Among the above-mentioned conjugated polymeric compounds, an acetylene high polymer, poly-p-phenylene, poly-(2,5-thienylene) and polypyrrole are preferred. The optimum polymeric compound is an acetylene high polymer.

The process for the preparation of the acetylene high polymer, which is preferably adopted in the present invention, is not particularly critical, and any of the known processes may be adopted. For example, there may be adopted processes disclosed in Japanese Examined Patent Publications No. 32,581/73 and No. 45,365/81, Japanese Unexamined Patent Publications No. 129,404/80, No. 128,419/80, No. 142,012/80, No. 10,428/81 and No. 133,133/81, Trans. Farady Soc., 64, 823 (1968), J. Polymer Sci., A-1, 7, 3419 (1969), Makromol. Chem., Rapid Comm., 1, 621 (1980), J. Chem. Phys., 69(1), 106 (1978), and Synthetic Metals, 4, 81 (1981).

In the present invention, an electrically conductive material such as graphite, carbon black, acetylene black, metal powder or carbon fiber may be incorporated in the conjugated polymeric compound, or a metal net or the like may be incorporated as a current collector.

In the present invention, the conjugated polymeric compound may be used as an electrode as it is or in the form of an electrically conductive polymeric compound obtained by doping the conjugated polymeric compound with a dopant.

Doping of the conjugated polymeric compound may be accomplished according to a chemical doping method or an electrochemical doping method.

Various known electron-accepting and electron-donating compounds may be used as the dopant to be chemically doped into the conjugated polymeric compound. For example, there can be mentioned (i) halogen such as iodine, bromine and bromine iodide, (ii) metal halides such as arsenic pentafluoride, antimony pentafluoride, silicon tetrafluoride, phosphorus pentachloride, phosphorus pentafluoride, aluminum chloride, aluminum bromide and aluminum fluoride, (iii) protonic acids such as sulfuric acid, nitric acid, fluorosulfuric acid, trifluoromethanesulfonic acid and chlorosulfuric acid, (iv) oxidants such as a sulfur trioxide, nitrogen dioxide and difluorosulfonyl peroxide, (v) $AgClO_4$, and (vi) tetracyanoethylene, tetracyanoquinodimethane, chloranil, 2,3-dichloro-5,6-dicyano-p-benzoquinone and 2,3-dibromo-5,6-dicyano-p-benzoquinone.

As the dopant used for electrochemically doping the conjugated polymeric compound, there can be mentioned (i) anion dopants, for example, halide anions of elements of the group Va such as $PF_6^-$, $SbF_6^-$ $AsF_6^-$ and $SbCl_6^-$, halide anions of elements of the group IIIa such as $BF_4^-$, halogen anions such as $I^-$ ($I_3^-$), $Br^-$ and $Cl^-$ and perchloric acid anions such as $ClO_4^-$ (each of these anions is effective as a dopant for providing a p-type electrically conductive conjugated polymeric compound), and (ii) cation dopants, for example, alkali metal ions such as $Li^+$, $Na^+$ and $K^+$ and quaternary ammonium ions such as $R_4N^+$ (in which R stands for a hydrocarbon group having 1 to 20 carbon atmos) (each of these cations is effective for providing an n-type electrically conductive conjugated polymeric compound). Of course, dopants that can be used in the present invention are not limited to those exemplified above.

Where an electrically conductive polymeric compound obtained by preliminarily doping a dopant into a conjugated polymeric compound is used as an electrode, it is preferred that the dopant to be preliminarily doped into the negative electrode be the same as the asymmetric quaternary ammonium cation used as the electrolyte of the battery of the present invention.

The amount of the dopant used in the battery of the present invention can be freely controlled by measuring the quantity of the electric current flowing at the electrolysis. Doping may be performed at a constant current or under a constant voltage, or under conditions where both the current and the voltage are changed. The current and voltage values at the doping step and the doping time vary depending on the kind, bulk density and area of the conjugated polymeric compound used, the kind of the dopant, the kind of the electrolytic solution and the desired electrical conductivity.

The amount of the dopant doped in the conjugated polymeric compound is 2 to 40 mole %, preferably 4 to 30 mole %, especially preferably 5 to 20 mole %, based on the recurring units of the conjugated polymeric compound. If the amount of the dopant doped is smaller than 2 mole % or larger than 40 mole %, a secondary battery having a sufficiently large discharge capacitance cannot be obtained.

The electrical conductivity of the conjugated polymeric compound in the non-doped state is not larger than $10^{-5} \Omega^{-1} \cdot cm^{-1}$, and the electrical conductivity of the electrically conductive conjugated polymeric compound obtained by doping with a dopant is about $10^{-10}$ to about $10^4 \omega^1 \cdot cm^{-1}$.

The electrolyte used in the battery of the present invention is an ammonium salt represented by the above general formula.

As specific examples of the cation component of the ammonium salt, there can be mentioned trimethylpropylammonium, trimethylbutylammonium, trimethylhexylammonium, trimethyloctylammonium, trimethylisobutylammonium, trimethyl-t-butylammonium, trimethylisopropylammonium, trimethylisobutylammonium, trimethylhexadecylammonium, trimethylpentylammonium, trimethylphenylammonium, triethylbutylammonium, triethylpropylammonium, triethylmethylammonium, triethylhexylammonium, triethylphenylammonium, tripropylbutylammonium, tributylmethylammonium, tributylethylammonium, dipropyldiethylammonium, dibutyldiethylammonium, dibutyldimethylammonium, dimethyldiphenylammonium, diethyldiphenylammonium, dibutylethylmethylammonium, dipropylethylmethylammonium, butylpropylethylmethylammonium, triethylmesitylammonium, trimethylxylylammonium and triethyl-4-ethylphenylammonium.

As specific examples of the anion component forming the ammonium salt with the above-mentioned cation component, there can be mentioned $HF_2^-$, $ClO_4^-$, $AlCl_4^-$, $BF_4^-$, $FeCl_4^-$, $SnCl_5^-$, $PF_6^-$, $PCl_6^-$, $SiF_4^-$, $SbF_6^-$, $AsF_6^-$, $SO_3^-$, $HSO_4^-$, and $CF_3SO_3^-$. Furthermore, there may be used halogen anions such as $Br^-$, $I^-$, $Cl^-$ and $F^-$ and anions of compounds of B (boron) and an alkyl or aryl group, represented by the following formula:

wherein B stands for boron and $R_1$ through $R_4$ stand for an alkyl group having 1 to 16 carbon atoms or an aryl group having 6 to 15 carbon atoms, and $R_1$ through $R_4$ may be the same or different.

As specific examples of the ammonium salt, there can be mentioned triethylbutylammonium tetrafluoroborate, triethylbutylammonium perchlorate, triethylbutylammonium hexafluorophosphate, trimethylbutylammonium trifluoromethanesulfonate, trimethylethylammonium tetrafluoroborate, trimethylethylammonium hexafluorophosphate, dibutyldiethylammonium perchlorate, tributylethylammonium tetrafluoroborate, butylpropylethylmethylammonium hexachlorophosphate, trimethylphenylammonium tetrafluoroborate, triethylphenylammonium tetrafluoroborate, trimethylphenylammonium tetraphenyl borate, trimethylphenylammonium tetrabutyl borate, triethylbutylammonium tetrabutyl borate, triethylmesitylammonium tetrafluoroborate, trimethylxylylammonium tetrafluoroborate and triethyl-4-ethylphenyl tetrafluoroborate. Of course, ammonium salts that can be used in the present invention are not limited to those exemplified above. These ammonium salts may be used singly or in the form of mixtures of two or more of them.

The ammonium salt of the present invention may be used in the form of a mixed electrolyte with other alkyl ammonium salt such as a tetrabutylammonium salt or tetraethylammonium salt. Moreover, the ammonium salt may be used in the form of a mixed electrolyte with an alkali metal salt such as a lithium salt, a sodium salt or a potassium salt.

Furthermore, the ammonium salt of the present invention may be used in the form of a mixture with an electrolyte comprising as the cation component a pyrylium or pyridinium cation represented by the following formula (I):

wherein X stands for an oxygen or nitrogen atom, R' stands for a hydrogen atom, an alkyl group having 1 to 15 carbon atoms or an aryl group having 6 to 15 carbon atoms, R" stands for a halogen atom, an alkyl group having 1 to 10 carbon atoms or an aryl group having 6 to 15 carbon atoms, m is 0 when X is an oxygen atom or m is 1 when X is a nitrogen atom, and n is 0 or an integer of from 1 to 5, or carbonium cation represented by the following formula (II) or (III):

or

-continued $$R^4-\underset{\underset{O}{\|}}{C}{}^+ \quad (III)$$

wherein $R^1$, $R^2$ and $R^3$ stand for a hydrogen atom (the case where all of $R^1$, $R^2$ and $R^3$ are hydrogen atoms is excluded), an alkyl group having 1 to 15 carbon atoms, an allyl group, an aryl group having 6 to 15 carbon atoms or a group —$OR^5$ (in which $R^5$ stands for an alkyl group having 1 to 10 carbon atoms or an aryl group having 6 to 15 carbon atoms), and $R_4$ stands for a hydrogen atom, an alkyl group having 1 to 15 carbon atoms or an aryl group having 6 to 15 carbon atoms.

When a mixture of the ammonium salt comprising an asymmetric quaternary ammonium ion as the cation component and other electrolyte is used, it is preferred that the amount of the ammonium salt be larger than the equimolar amount.

As the organic solvent to be used for forming the electrolytic solution used in the present invention, there can be mentioned aliphatic nitrile compounds, aromatic nitrile compounds, ethers, esters, amides, carbonates, sulfolane compounds and halogen compounds. Aliphatic nitrile compounds and aromatic nitrile compounds are preferred, and aromatic nitrile compounds are especially preferred.

As specific examples of the organic solvent, there can be mentioned tetrahydrofuran, 2-methyltetrahydrofuran, 1,4-dioxane, anisole, monogrime, acetonitrile, propionitrile, butyronitrile, valeronitrile, 4-methyl-2-pentanone, benzonitrile, o-tolunitrile, m-tolunitrile, p-tolunitrile, α-tolunitrile, 1,2-dichloroethane, γ-butyrolactone, dimethoxyethane, methyl formate, propylene carbonate, ethylene carbonate, dimethylformamide, dimethylsulfoxide, dimethylthioformamide, sulfolane, 3-methylsulfolane, trimethyl phosphate and triethyl phosphate. Among these solvents, acetonitrile, propionitrile, butyronitrile, valeronitrile, benzonitrile, α-tolunitrile, o-tolunitrile, m-tolunitrile and p-tolunitrile are preferably used. Benzonitrile, o-tolunitrile, m-tolunitrile and p-tolunitrile are especially preferred. These solvents may be used in the form of mixed solvents.

It is preferred that the concentration of the electrolyte used in the secondary battery of the present invention be 0.5 to 10 moles per liter, especially 1 to 10 moles per liter, particularly especially 2 to 10 moles per liter. If the concentration of the electrolyte is extremely low, the self-discharge rate is relatively high. The electrolytic solution may be of the homogeneous system or of the heterogeneous system in which the concentration of the electrolyte is higher than the saturation concentration and the undissolved electrolyte is contained.

The conjugated polymeric compound or the electrically conductive conjugated polymeric compound obtained by doping the conjugated polymeric compound with a dopant can be used as the active material of (i) a negative electrode or (ii) positive and negative electrodes of a battery. In order to exert the effects of the present invention at the maximum, use of a battery of the type (ii) is preferred.

In the case of a secondary battery where an acetylene high polymer is used as the conjugated polymeric compound, as an example of the secondary battery of the type (i), there can be mentioned graphite (positive electrode)/$Et_3BuN)^+.(ClO_4)^-$ (electrolyte)/$(CH)_x$ (negative electrode), and as examples of the secondary battery of the type (ii), there can be mentioned $[(CH)^{+0.024}(ClO_4)^{-0.024}]_x$ (positive electrode)/$(Me_3BuN)^+.(ClO_4)^-$ (electrolyte)/$[(Me_3BuN)^{+0.024}(CH)^{-0.024}]_x$ (negative electrode), $[(CH)^{+0.06}(PF_6)^{-0.06}]_x$ (positive electrode)/$(Bu_3EtN)^+.(PF_6)^-$ (electrolyte)/$[(Bu_3EtN)^{+0.06}(CH)^{-0.06}]_x$ (negative electrode and $[(Et_3BuN)^{+0.02}(CH)^{-0.02}]_x$ (positive electrode)/$(Et_3BuN)^+.(ClO_4)^-$ (electrtolyte)/$[(Et_3BuN)^{+0.07}(CH)^{-0.07}]_x$ (negative electrode), in which $(CH)_x$ stands for an acetylene high polymer.

When poly-p-phenylene is used, secondary batteries of the above-mentioned structures can be used where $(C_6H_4)_x$ is substituted for $(CH)_x$. When poly(2,5-thienylene) or polypyrrole is used, secondary batteries of the above-mentioned structures can be used in which $(C_4H_3S)_x$ or $(C_4H_3N)_x$ is substituted for $(CH)_x$, respectively.

In the present invention, different conjugated polymeric compounds may be used for the positive and negative electrodes. For example, there can be mentioned $(CH)_x/Et_3BuN.ClO_4/(C_6H_4)_x$, $(CH)_x/Me_3BuN.BF_4/(C_4H_2S)_x$ and $(C_6H_4)_x/Et_2Bu_2N.PF_6/(C_4H_2S)_x$.

necessary, a porous film of a synthetic resin such as polyethylene or polypropylene or a natural fiber paper may be used as a separator in the present invention.

A part of the conjugated polymeric compounds used in the present invention is gradually oxidized by oxygen and the capacities of the battery are reduced. Accordingly, it is necessary that the battery should be closed to produce a substantially oxygen-free state.

The secondary battery of the present invention has a high energy density, a high charging-discharging efficiency, a long cycle life, a low self-discharge rate and a good voltage levelness at the discharging step. Furthermore, the battery of the present invention has a light weight and a small size and has a high energy density. Accordingly, the secondary battery of the present invention is useful for a portable appliance, an electric automobile or a gasoline car or as a power storage battery.

The present invention will now be described in detail with reference to the following examples and comparative examples.

EXAMPLE 1

[Preparation of filmy acetylene high polymer]

In a nitrogen atmosphere, a glass reaction vessel having an inner capacity of 500 ml was charged with 1.7 ml of titanium tetrabutoxide. The titanium tetrabutoxide was dissolved in 30 ml of anisole and then, 2.7 ml of triethyl aluminum was added with stirring to the solution to form a catalyst solution.

The reaction vessel was cooled by liquid nitrogen and nitrogen gas in the system was removed by a vacuum pump. Then, the reaction vessel was cooled to $-78°$ and refined acetylene gas maintained at a pressure of 1 atmosphere was blown into the reaction vessel while the catalyst solution was kept stationary.

Immediately, the polymerization took place on the surface of the catalyst solution and a filmy acetylene high polymer was formed. When 30 minutes had passed from the point of the start of introduction of the acetylene gas, the acetylene gas in the reaction vessel was removed to stop the polymerization. In a nitrogen atmosphere, the catalyst solution was removed by an injector, and the formed polymer was washed 5 times repeatedly with 100 ml of refined toluene while maintaining the temperature at −78° C. The thus-prepared filmy acetylene high polymer swollen with toluene was a uniform swollen film is which fibrils were densely entangled with one another. Then, the swollen film was vacuum-dried to botain a filmy acetylene high polymer having a reddish violet color and a metallic gloss. This filmy acetylene high polymer had a thickness of 100 μm and a cis content of 98%. The bulk density of the filmy acetylene high polymer as 0.30 g/cc and the electrical conductivity was $3.2 \times 10^{-9} \, \Omega^{-1}.cm^{-1}$ as measured at 20° C. according to the direct current four-terminal method.

[Battery test]

Two discs having a diameter of 20 mm were cut out from the thus-prepared filmy acetylene polymers and a battery was constructed by using these discs as the positive and negative electrode active materials.

Figure 1:
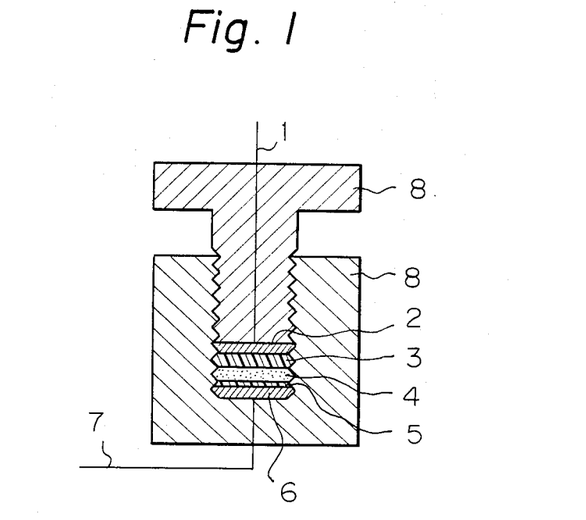
FIG. 1 is a sectional diagram illustrating an electrolytic cell for measuring the characteristics of a secondary battery according to one embodiment of the present invention.

FIG. 1 is a sectional diagram illustrating a battery cell for measuring the characteristics of a secondary battery according to one embodiment of the present invention. Reference numeral 1 represents a platinum lead wire for the negative electrode, reference numeral 2 represents an 80-mesh platinum net collector for the negative electrode having a diamete of 20 mm, reference numeral 3 represents a disc-shaped negative electrode having a diameter of 20 mm, reference numeral 4 represents a circular porous polypropylene separator having a diameter of 20 mm and thick enough to effect sufficient impregnation with an electrolytic solution, reference numeral 5 represents a disc-shaped positive electrode having a diameter of 20 mm, reference numeral 6 represents an 80-mesh platinum net collector for the positive electrode having a diameter of 20 mm, reference numeral 7 represents a platinum lead wire for the positive electrode, and reference numeral 8 represents a Teflon (polytetrafluoroethylene) vessel of the screw-in type.

At first, the platinum net collector 6 for the positive electrode was placed in the recess in the lower portion of the Teflon vessel 8, and then the positive electrode 5 was placed on the platinum net collector 6 for the positive electrode. The porous polypropylene membrane 4 was superimposed on the positive electrode 5 and sufficiently impregnated with an electrolytic solution. Then, the negative electrode 3 was superimposed on the membrane 4 and the platinum net collector 2 for the negative electrode was placed on the positive electrode 3, and the Teflon vessel 8 was clamped to form a battery.

A solution formed by dissolving $Et_3BuN.BF_4$ at a concentration of 1 mole per liter in distilled and dehydrated benzonitrile according to customary procedures was used as the electrolytic solution.

In this battery, charging was conducted under a constant current (4.0 mA/cm²) in an argon atmosphere for 15 minutes (the quantity of electricity corresponds to the doping quantity of 5 mole %). After termination of charging, discharging was carried out under a constant current (4.0 mA/cm²), and when the battery voltage was reduced to 1 V, charging was carried out under the same conditions as described above. Thus, the charging-discharging test was conducted. The repetition frequency of charging-discharging conducted until the charging-discharging efficiency was reduced to 50% was 700 times. The relation between the discharge time and the voltage at the 5th discharging in the above test is represented by curve (a) in FIG. 2.

At the 5th charging-discharging, the energy density was 140 W·hr/kg and the charging-discharging efficiency was 99%. When the battery was allowed to stand still in the charged state for 48 hours, the self-discharge rate was 3.0%.

COMPARATIVE EXAMPLE 1

The charging-discharging test of the battery was carried out in the same manner as described in Example 1 except that $Bu_4N.BF_4$ was used as the electrolyte of the electrolytic solution instead of $Et_3BuN.BF_4$. The highest charging-discharging efficiency was 96%, and discharging became impossible when charging-discharging was repeated 410 times.

Figure 2:
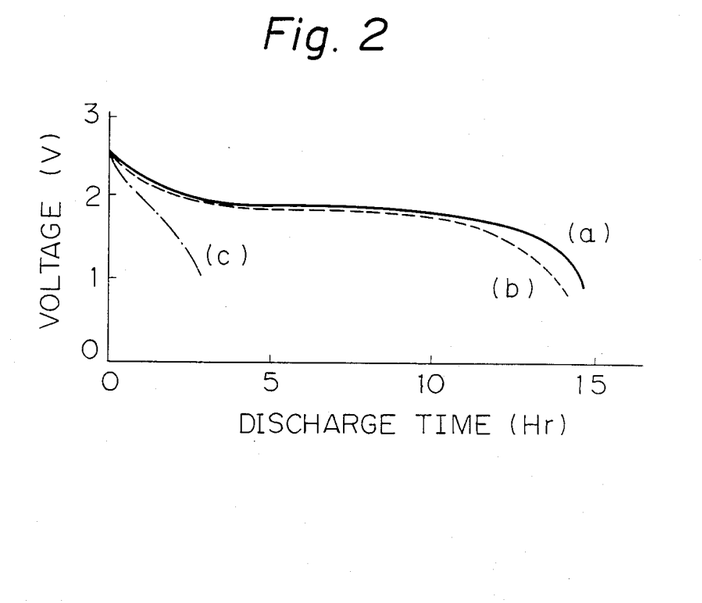
FIG. 2 shows curves of the relations between the discharge time and the voltage, which are observed in a battery of Example 1 of the present invention and batteries of Comparative Examples 1 and 3.

The relation between the discharge time and the voltage at the 5th discharging in the battery test is represented by curve (b) in FIG. 2. At the 5th charging-discharging, the energy density was 130 W·hr/kg and the charging-discharging, the energy density was 96%. When the battery was allowed to stand still in the charged state for 48 hours, the self-discharge rate was 5.2%.

COMPARATIVE EXAMPLE 2

The battery test was tried in the same manner as described in Example 1 except that $Et_4N.BF_4$ was used as the electrolyte of the electrolytic solution instead of $Et_3BuN.BF_4$ in the same molar amount. It was found that $Et_4N.BF_4$ was almost insoluble in benzonitrile. The charging-discharging test of the battery was conducted in the same manner as described in Example 1 in the state where the undissolved $Et_4N.BF_4$ was precipitated. The highest charging-discharging efficiency was 72%, and discharging became impossible when charging-discharging was repeated 25 times.

COMPARATIVE EXAMPLE 3

The battery test was tried in the same manner as described in Example 1 except that $LiBF_4$ was used instead of $Et_3BuN.BF_4$ in the same molar amount. It was found that $LiBF_4$ was not completely dissolved in benzonitrile. The charging-discharging test of the battery was carried out in the same manner as described in Example 1 in the state where a part of $LiBF_4$ was not dissolved but precipitated. The highest charging-discharging efficiency was 24%, and discharging became impossible when charging-discharging was repeated 12 times.

The relationship between the discharge time and the voltage at the 5th discharging at the battery test is represented by curve (c) in FIG. 2. The energy density at the 5th charging-discharging was 24 W·hr/kg and the charging-discharging efficiency was 18%.

EXAMPLE 2

A 100-mesh net of stainless steel was placed in a 1-liter glass reaction vessel, the inside atmosphere of which was completely substituted by nitrogen gas, and 100 ml of toluene refined according to the conventional method was charged as the polymerization solvent. Then, 4.41 millimoles of tetrabutoxy titanium and 11.01 millimoles of triethyl aluminum were charged as the catalyst into the reaction vessel at room temperature to form a catalyst solution. The catalyst solution was homogeneous. Then, the reaction vessel was cooled by liquid nitrogen, and nitrogen gas in the reaction vessel was removed by a vacuum pump. The reaction vessel was cooled to −78° C. and refined acetylene gas maintained at a pressure of 1 atmosphere was blown into the reaction vessel while the catalyst solution kept stationary. The polymerization was carried out for 10 hours while maintaining the pressure of the acetylene gas at 1 atmosphere. A gel-like product having a reddish violet color was obtained. After completion of the polymerization, the unreacted acetylene gas was removed, and the reaction product was washed 4 times repeatedly with 200 ml of refined toluene while maintaining the temperature at −78° C. to obtain a stainless steel net-containing sheet-like swollen acetylene high polymer having a thickness of about 0.5 cm and swollen with toluene. This swollen acetylene high polymer was composed of fibrous fine crystals (fibrils) having a diameter of 300 to 500 angstroms and regularly entangled with one another, and no powdery of bulky polymer was found.

This stainless steel net-containing sheet-like swollen acetylene high polymer was placed between chromium-deposited ferro type plates and preliminarily pressed at room temperature under a pressure of 100 kg/cm$^2$. Then, the sheet-like polymer was pressed under a pressure of 15 ton/cm$^2$ to obtain a uniform flexible composite product having a metallic gloss and a reddish brown color and having a thickness of 280 μm. The composite product was vacuum-dried at room temperature for 5 hours. This composite product contained 43% by weight of the stainless steel net.

[Battery test]

Two discs having a diameter of 20 mm were cut out from the thus-obtained composite product and a battery was constructed by using these discs as the positive electrode and negative electrode active materials. A solution formed by dissolving Me$_3$BuN.ClO$_4$ at a concentration of 1 mole per liter in distilled and dehydrated acetonitrile was used as the electrolytic solution. In the same cell as used in Example 1, the charging-discharging test was carried out. The charging was conducted under a charging current density of 5.0 mA/cm$^2$ for 15 minutes (the doping quantity was 5 mole %). After termination of the charging, the discharging was carried out under a discharging current density of 5.0 mA/cm$^2$. When the voltage of the battery was reduced to 1 V, the charging was carried out under the same conditions as described above. Thus, the charging-discharging test was conducted. The repetition frequency of charging-discharging conducted until the charging-discharging efficiency was reduced to 50% was 420 times.

At the 5th charging-discharging, the energy density was 152 W·hr/kg and the charging-discharging efficiency was 98%. When the battery was allowed to stand still in the charged state for 48 hours, the self-discharge rate was 9.5%.

COMPARATIVE EXAMPLE 4

The charging-discharging test of the battery was carried out in the same manner as described in Example 2 except that Et$_4$N.BF$_4$ was used as the electrolyte of the electrolytic solution instead of Me$_3$BuN.BF$_4$. The repetition frequency of charging-discharging conducted until the charging-discharging efficiency was reduced to 50% was 285 times.

At the 5th charging-discharging, the energy density was 145 W·hr/kg and the charging-discharging efficiency was 96%. When the battery was allowed to stand still in the charged state for 48 hours, the self-discharge rate was 16.5%.

COMPARATIVE EXAMPLE 5

When the charging-discharging test was tried in the same manner as described in Example 2 except that Me$_4$N.BF$_4$ wa used as the elecyrolyte of the electrolytic solution instead of Me$_3$BuN.BF$_4$. It was found that Me$_4$N.BF$_4$ was almost insoluble in acetonitrile. The test became impossible before charging-discharging was repeated 100 times.

EXAMPLE 3

The battery test was carried out in the same manner as described in Example 1 except that a disc having a diameter of 20 mm, which was prepared by molding under a pressure of 1 ton/cm$^2$ poly(p-phenylene) prepared according to the process disclosed in Bull. Chem, Soc., Japan, 51, 2091 (1978), was used as the positive electrode.

The voltage characteristic at the 250th discharging were substantially the same as those at the first discharging. The repetition frequency of charging-discharging conducted until the charging-discharging efficiency was reduced to 50% was 365 times. The energy density of this battery was 162 W·hr/kg and the charging-discharging efficiency was 91%. When the battery was allowed to stand still in the charged state for 48 hours, the self-discharge rate was 4.5%.

COMPARATIVE EXAMPLE 6

A battery was constructed in the same manner as described in Example 3 except that Pr$_4$N.BF$_4$, which is a symmetric alkyl ammonium salt capable of being dissolved in benzonitrile at a concentration of about 1 mole/liter and having a molecular weight close to that of Et$_3$BuN.BF$_4$, was used as the electrolyte of the electrolic solution instead of Et$_3$BuN.BF$_4$.

By using this battery, the battery test was carried out in the same manner as described in Example 3. The test became impossible when charging-discharging was repeated 215 times. The energy density of the battery was 145 W·hr/kg and the charging-discharging efficiency was 88%. When the battery was allowed to stand still in the charged state for 48 hours, the self-discharge rate was 18%.

EXAMPLE 4

In the same cell as used in Example 1, the battery test was carried out in the same manner as described in Example 1 by using the same filmy acetylene high polymer as used in Example 1, except that propylene carbonate was used as the solvent of the electrolytic solution. The repetion frequency of charging-discharging conducted until the charging-discharging efficiency was reduced to 50% was 485 times. At the 5th charging-discharging, the energy density was 142 W·hr/kg and the charging-discharging efficiency was 99%. When the battery was allowed to stand still in the charged state for 48 hours, the self-discharge rate was 12%.

COMPARATIVE EXAMPLE 7 the battery test was carried out in the same manner as described in Example 4 except that Bu$_4$N.BF$_4$ was used as the electrolyte of the electyrolytic solution instead of Et$_3$BuN.BF$_4$. The test became impossible when charging-discharging was repeated 180 times. At the 5th charging-discharging, the energy density of the battery was 132 W·hr/kg and the charging-discharging efficiency was 97%. When the battery was allowed to stand still in the cahrged state for 48 hours, the self-discharging rate was 22%.

COMPARATIVE EXAMPLE 8

The battery test was carried out in the same manner as described in Example 4 except that Et$_4$N.BF$_4$ was used as the electrolyte of the electrolytic solution instead of Et$_3$BuN.BF$_4$. The test became impossible when charging-discharging was repeated 235 times. At the 5th charging-discharging, the energy density of the battery was 140 W·hr/kg and the charging-discharging efficiency was 98%. When the battery was allowed to stand still in the charged state for 48 hours, the self-discharge rate was 15%.

COMPARATIVE EXAMPLE 9

The battery test was carried out in the same manner as described in Example 4 except that LiBF$_4$ was used as the electrolyte of the electrolytic solution instead of Et$_3$BuN.BF$_4$. The test became impossible when charging-discharging was repeated 88 times. At the 5th charging-discharging, the energy density of the batter was 121 W·hr/kg and the charging-discharging efficiency was 92%. When the battery was allowed to stand still in the state for 48 hours, the self-discharge rate was 4.2%.

EXAMPLES 5 THROUGH 11

The charging-discharging test was carried out in the same manner as described in Example 1 except that the electrolyte and solvent were changed as indicated in Table 1. the obtained results are shown in Table 1. In Table 1, the energy density is one obtained at the 5th charging-discharging, and the cycle life indicates the repetition frequency of charging-discharging conducted until the charging-discharging efficiency was reduced to 50%. The self-discharge rate is one measured after standing in the open circuit for 48 hours from the point of termination of charging.

stand still in the charged state for 48 hours, the self-discharge rate was 1.2%.

COMPARATIVE EXAMPLE 10

The charging-discharging test was carried out in the same manner as described in Example 12 except that Bu$_4$N.BF$_4$ was used as the electrolyte of the electrolytic solution instead of Et$_3$BuN.BF$_4$. The highest charging-discharging efficiency was 96%, and discharging became impossible when charging-discharging was repeated 479 times.

At the 5th charging-discharging, the energy density was 130 W·hr/kg and the charging-discharging efficiency was 96%. When the battery was allowed to stand still in the charged state for 48 hours, the self-discharge rate was 4.9%.

COMPARATIVE EXAMPLE 11

A battery was prepared in the same manner as described in Example 12 except that Et$_4$N.BF$_4$ was used as the electrolyte of the electrolytic solution instead of Et$_3$BuN.BF$_4$ in the same molar amount. It was found that Et$_4$N.BF$_4$ was almost insoluble in benzonitrile. The charging-discharging test of the battery was carried out in the same manner as described in Example 12 in the state where the undissolved Et$_4$N.BF$_4$ was precipitated. The highest charging-discharging efficiency was 72%, and discharging became impossible when the test was repeated 25 times.

COMPARATIVE EXAMPLE 12

A battery was prepared in the same manner as described in Example 12 except that LiBF$_4$ was used as the electrolyte of the electrolytic solution instead of Et$_3$BuN.BF$_4$ in the same molar amount. It was found that LiBF4 was not completely dissolved in benzonitrile. The charging-discharging test of the battery was carried out in the same manner as described in Example 12 in the state where a part of LiBF4 was not dissolved but precipitated. The highest charging-discharging efficiency was 24%, and discharging became impossible when charging-discharging was repeated 12 times.

TABLE 1

| Example No. | Electrolyte | Solvent | Energy Density (W · hr/kg) | Cycle Life (times) | Self-Discharge Rate (%) |
|---|---|---|---|---|---|
| 5 | Et$_3$BuN.ClO$_4$ | m-tolunitrile | 134 | 812 | 3.5 |
| 6 | " | chlorobenzene | 122 | 692 | 3.2 |
| 7 | Et$_3$BuN.BF$_4$ | m-tolunitrile | 135 | 821 | 3.0 |
| 8 | Et$_3$PrN.ClO$_4$ | acetonitrile | 167 | 395 | 12.0 |
| 9 | Et$_2$Bu$_2$N.PF$_6$ | " | 152 | 365 | 13.5 |
| 10 | Bu$_3$EtN.BF$_4$ | benzonitrile | 132 | 603 | 4.2 |
| 11 | Et$_3$t-BuN.BF$_4$ | " | 135 | 821 | 3.0 |

EXAMPLE 12

By using a filmy acetylene high polymer prepared in the same manner as described in Example 1, in the same cell as used in Example 1, the battery test was carried out in the same manner as described in Example 1 except that the concentration of Et$_3$BuN.BF$_3$ in the electrolytic solution was changed to 3 moles per liter.

The repetition frequency of charging-discharging conducted until the charging-discharging efficiency was reduced 50% was 893 times.

At the 5th charging-discharging, the energy density was 140 W·hr/kg and the charging-discharging efficiency was 99%. When the battery was allowed to At the 5th charging-discharging, the energy density was 24 W·hr/kg and the charging-discharging efficiency was 18%.

EXAMPLE 13

By using the same stainless steel net-containing sheet-like swollen acetylene high polymer as prepared in Example 2, in the same cell as used in Example 2, the battery test was carried out in the same manner as described in Example 2 except that the concentration of Et$_3$BuN.ClO$_4$ in the electrolytic solution was adjusted to 4 moles per liter. The repetition frequency of charging-discharging conducted until the charging-discharging efficiency was reduced to 50% was 663 times.

At the 5th charging-discharging at this test, the energy density was 152 W·hr/kg and the charging-discharging efficiency was 98%. When the battery was allowed to stand still in the charge state for 48 hours, the self-discharge rate was 6.3%.

EXAMPLE 14

The battery test was carried out in the same manner as described in Example 12 except that a disc having a diameter of 20 mm, which was formed by molding under a pressure of 1 ton/cm$^2$ poly(p-phenylene) prepared according to the process disclosed in Bull. Chem. Soc. Japan, 51, 2091 (1978), was used as the positive electrode. The discharging voltage characteristics at the 313th charging-discharging were substantially the same as those at the first charging-discharging. The repetition frequency of charging-discharging conducted until the charging-discharging efficiency was reduced to 50% was 417 times. The energy density of this battery was 166 W·hr/kg and the charging-discharging efficiency was 93%. When the battery was allowed to stand still in the charged state for 48 hours, the self-discharge rate was 3.7%.

EXAMPLE 15

The battery test was carried out in the same manner as described in Example 14 except that poly(2,5-thienylene) prepared according to the process disclosed in J. Polym. Sci., Polym. Lets., Ed., 18, 9 (1980) was used instead of the poly(p-phenylene) used in Example 14. The repetition frequency of charging-discharging conducted until the charging-discharging efficiency was reduced to 50% was 505 times. The energy density of the battery was 158 W·hr/kg and the charging-discharging efficiency was 97%. When the battery was allowed to stand still in the charged state for 48 hours, the self-discharge rate was 4.1%.

EXAMPLES 16 THROUGH 22

The charging-discharging repetition test was carried out in the same manner as described in Example 12 except that the electrolyte and solvent were changed as indicated in Table 2. The obtaining results are shown in Table 2. In Table 2, the energy density is one obtained at the 5th charging-discharging, and the cycle life indicates the repetition frequency of charging-discharging conducted until the charging-discharging efficiency was reduced to 50%. The self-discharge rate is one determined after standing still in the open circuit for 48 hours from the point of termination of charging.

TABLE 2

| Example No. | Electrolyte | Solvent | Energy Density (W·hr/kg) | Cycle Life (times) | Self-Discharge Rate (%) |
|---|---|---|---|---|---|
| 16 | Et$_3$BuN.ClO$_4$ | m-tolunitrile | 134 | 929 | 2.5 |
| 17 | " | chlorobenzene | 122 | 874 | 2.8 |
| 18 | Et$_3$BuN.BF$_4$ | m-tolunitrile | 135 | 911 | 2.5 |
| 19 | Et$_3$PrN.ClO$_4$ | acetonitrile | 167 | 553 | 9.3 |
| 20 | Et$_2$Bu$_2$N.PF$_6$ | " | 152 | 487 | 8.8 |
| 21 | Bu$_3$EtN.BF$_4$ | benzonitrile | 132 | 716 | 3.4 |
| 22 | Et$_3$t-BuN.BF$_4$ | " | 135 | 933 | 2.7 |

EXAMPLE 23

The battery test was carried out in the same manner as described in Example 12 except that propylene carbonate was used as the solvent and the concentration of the electrolyte in the electrolytic solution was changed to 8 moles per liter.

The repetition frequency of charging-discharging conducted until the charging-discharging efficiency was reduced to 50% was 625 times. At the 5th charging-discharging, the energy density was 168 W·hr/kg and the charging-discharging efficiency was 99%. When the battery was allowed to stand still in the charged state for 48 hours, the self-discharge rate was 8.9%.

EXAMPLE 24

The battery test was carried out in the same manner as described in Example 14 except that filmy polypyrrole prepared according to the process disclosed in Diaz et al: J. Electroanal Chem., 129,115 (1981) was used as the positive electrode and a 3 mol/l solution of triethylmesitylammonium tetrafluoroborate in benzonitrile was used as the electrolytic solution. All other conditions remained the same. The repetition frequency of charging-discharging conducted until the charging-discharging efficiency was reduced to 50% was 925 times. At the 5th charging-discharging, the energy density of the battery was 125 W·hr/kg and the charging-discharging efficiency was more than 99%. When the battery was allowed to stand still in the charged state for 48 hours, the self-discharge rate was 1.5%.

We claim:

1. A secondary battery comprising a polymeric compound having conjugated double bonds in the main chain as a material of a negative electrode or a material of positive and negative electrodes, wherein an ammonium salt represented by the following general formula:

wherein R$_1$, R$_2$, R$_3$ and R$_4$ stand for an alkyl group having 1 to 16 carbon atoms or an aryl group having 6 to 15 carbon atoms, with the proviso that the case where all of R$_1$, R2, R$_3$ and R$_4$ are the same groups is excluded, and X is an anion, is used as the electrolyte.

2. A secondary battery according to claim 1, wherein the polymeric compound having conjugated double bonds in the main chain is selected from the group consisting of an acetylene high polymer, poly-p-phenylene, poly(2,5-thienylene) and polypyrrole.

3. A secondary battery according to claim 1, wherein the polymeric compound having conjugated double bonds in the main chain is polyacetylene.

4. A secondary battery according to claim 1, wherein the polymeric compound having conjugated double bonds in the main chain is in the form of an electrically conductive polymeric compound obtained by doping said polymeric compound with 2 to 40 mole %, based on the recurring units of said polymeric compound, of a dopant.

5. A secondary battery according to claim 1, wherein said ammonium salt comprises as the cation component an ammonium cation selected from the group consisting of trimethylpropylammonium, trimethylbutylammonium, trimethylhexylammonium, trimethyloctylammonium, trimethylisobutylammonium, trimethyl-t- butylammonium, trimethylisopropylammonium, trimethylisobutylammonium, trimethylhexadecylammonium, trimethylpentylammonium, trimethylphenylammonium, triethylbutylammonium, triethylpropylammonium, triethylmethylammonium, triethylhexylammonium, triethylphenylammonium, tripropylbutylammonium, tributylmethylammonium, tributylethylammonium, dipropyldiethylammonium, dibutyldiethylammonium, dibutyldimethylammonium, dimethyldiphenylammonium, diethyldiphenylammonium, dibutylethylmethylammonium, dipropylethylmethylammonium and butylpropylethylmethylammonium.

6. A secondary battery according to claim 1, wherein said ammonium salt comprises as the anion component $X^-$ an anion selected from the group consisting of $AsF_6^-$, $SbF_6^-$, $PF_6^-$, $SiF_4^-$, $AlClO_4^-$, $FeCl_4^-$, $Br^-$, $I^-$, $Cl^-$, $F^-$, $HF_2^-$, $ClO_4^-$, $SO_3^-$, $HSO_4^-$, $CF_3SO_3^-$, and boron-containing anion represented by the formula:

wherein B stands for boron and $R_1$ through $R_4$ stand for an alkyl group having 1 to 16 carbon atoms or an aryl group having 6 to 15 carbon atoms, and $R_1$ through $R_4$ may be the same or different.

7. A secondary battery according to claim 1, wherein the electrolyte used comprises in addition to said ammonium an electrolyte, the cation component of which is selected from the group consisting of:

(1) a pyrylium or pyridinium cation represented by the following formula (I):

(I)

wherein X stands for an oxygen or nitrogen atom, R' stands for a hydrogen atom, an alkyl group having 1 to 15 carbon atoms or an aryl group having 6 to 15 carbon atoms, R" stands for a halogen atom, an alkyl group having 1 to 10 carbon atoms or an aryl group having 6 to 15 carbon atoms, m is 0 when X is an oxygen atom or m is 1 when X is a nitrogen atom, and n is 0 or an integer of from 1 to 5, and (2) carbonium cations represented by the following formula (II) or (III):

(II)

(III)

wherein $R^1$, $R^2$ and $R^3$ stand for a hydrogen atom , with the proviso that the case where all of $R^1$, $R^2$ and $R^3$ are hydrogen atoms is excluded, an alkyl group having 1 to 15 carbon atoms, an allyl group, an aryl group having 6 to 15 carbon atoms or a group $-OR^5$ in which $R^5$ stands for an alkyl group having 1 to 10 carbon atoms or an aryl group having 6 to 15 carbon atoms, and $R^4$ stands for a hydrogen atom, an alkyl group having 1 to 15 carbon atoms, or an aryl group having 6 to 15 carbon atoms.

8. A secondary battery according to claim 1, wherein the electrolyte is in the form of a solution in an organic solvent selected from the group consisting of aliphatic nitrile compounds, aromatic nitrile compounds, ethers, esters, amides, carbonates, sulfolane compounds and halogen compounds.

9. A secondary battery according to claim 8, wherein the organic solvent is an aliphatic nitrile compound or an aromatic nitrile compound.

10. A secondary battery according to claim 8, wherein the concentration of the electrolyte solution is in the range of 0.5 to 10 moles per liter.

11. A secondary battery according to claim 8, wherein the concentration of the electrolyte solution is in the range of 1 to 10 moles per liter.

* * * * *